(12) United States Patent
Gilton et al.

(10) Patent No.: US 11,782,786 B1
(45) Date of Patent: Oct. 10, 2023

(54) SYSTEMS AND METHODS FOR HANDLING INVALID FLOATING-POINT OPERATIONS WITHOUT EXCEPTIONS

(71) Applicant: General Electric Company, Schenectady, NY (US)

(72) Inventors: Jeffrey S. Gilton, Cincinnati, OH (US); Matthew B. Pfenninger, Cincinnati, OH (US); Serge Rosine, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/697,465

(22) Filed: Mar. 17, 2022

(51) Int. Cl.
*G06F 11/07* (2006.01)
*G06F 9/30* (2018.01)

(52) U.S. Cl.
CPC ........ *G06F 11/0793* (2013.01); *G06F 9/3013* (2013.01); *G06F 11/0721* (2013.01)

(58) Field of Classification Search
CPC .............. G06F 9/30101; G06F 9/3013; G06F 11/0721; G06F 11/079; G06F 11/0793
See application file for complete search history.

(56) References Cited

U.S. PATENT DOCUMENTS

| | | | |
|---|---|---|---|
| 10,140,099 B2 | 11/2018 | Kintali et al. | |
| 10,274,606 B1 | 4/2019 | Phan et al. | |
| 10,759,520 B2 | 9/2020 | Babazadeh | |
| 10,776,124 B2 | 9/2020 | Gabrielli et al. | |
| 10,936,769 B2 | 3/2021 | Kintali et al. | |
| 2011/0047358 A1* | 2/2011 | Eichenberger | G06F 9/30021 712/E9.016 |
| 2013/0173682 A1* | 7/2013 | Radmilac | G06F 7/483 708/507 |
| 2014/0280425 A1 | 9/2014 | Moyer | |
| 2020/0201600 A1 | 6/2020 | Alexander et al. | |
| 2021/0049011 A1 | 2/2021 | Harthcock | |

FOREIGN PATENT DOCUMENTS

CN 102124364 B 8/2013

OTHER PUBLICATIONS

Extended European Search Report for Application No. 22214238.2 dated Aug. 4, 2023 (7 pages).

* cited by examiner

*Primary Examiner* — Joseph R Kudirka
(74) *Attorney, Agent, or Firm* — Dinsmore & Shohl LLP

(57) ABSTRACT

A method to be performed by a processor includes determining whether an application software has called an application programming interface, upon determination that the application software has called the application programming interface, determining whether one or more floating-point errors are recorded in a floating-point status register, and upon determination that one or more floating-point errors are recorded in the floating-point status register, performing a predefined action for each type of floating-point error recorded in the floating-point status register.

20 Claims, 3 Drawing Sheets

SYSTEMS AND METHODS FOR HANDLING INVALID FLOATING-POINT OPERATIONS WITHOUT EXCEPTIONS

FEDERALLY SPONSORED RESEARCH STATEMENT

This invention was made with Government support under Contract No. W58RGZ-19-C-0003 awarded by the Department of the Army. The Government has certain rights in the invention.

FIELD

The present disclosure generally relates to handling invalid floating-point operations and, more particularly, to systems and methods for handling invalid floating-point operations in processors that don't generate exceptions for them.

BACKGROUND

With certain processor architectures, when application software causes a processor to perform a floating-point operation that results in an invalid result, the processor raises an exception, which must be immediately handled by the software. However, some processors do not raise an exception when an invalid floating-point operation is performed. Instead, these processors record a floating-point error in a special register dedicated to recording floating-point errors. It is up to the software to monitor the register and take appropriate action. Accordingly, a need exists for systems and methods for handling invalid floating-point operations in processors that do not generate exceptions for them.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Figure 1:
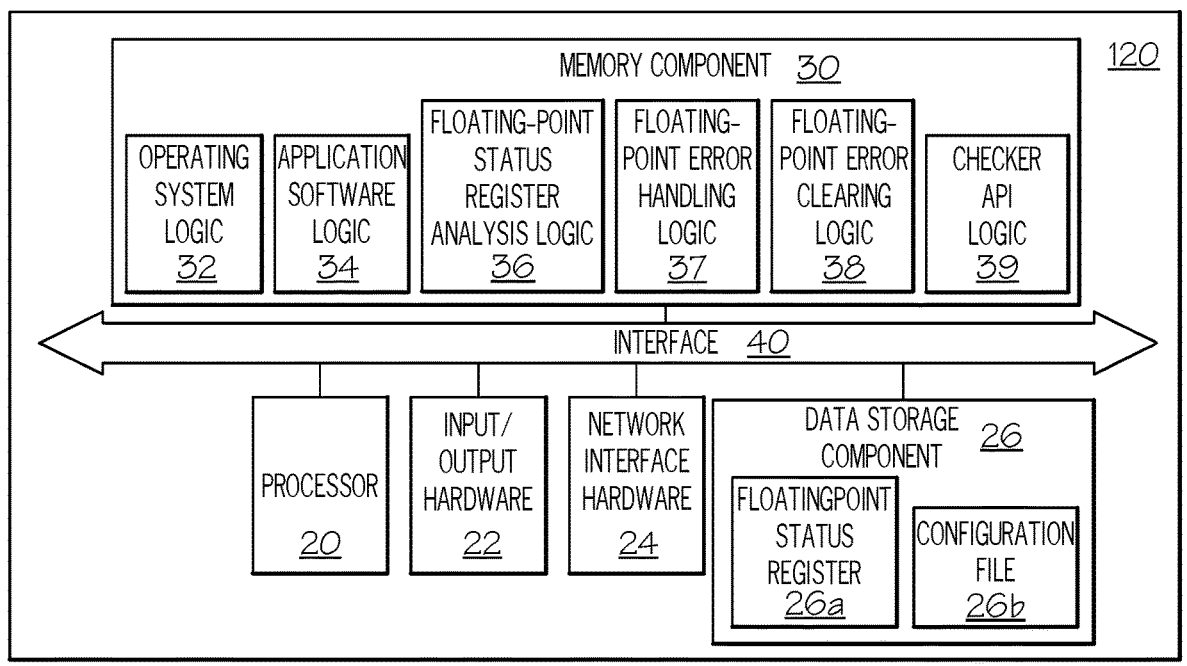
FIG. 1 schematically depicts illustrative hardware components of a device for handling invalid floating-point operations without exceptions, according to one or more embodiments shown and described herein.

Referring generally to the figures, embodiments described herein are directed to systems and methods for handling invalid floating-point operations in processors that don't raise exceptions for them. Application software often performs floating-point operations during execution by a processor. However, in order for a floating-point operation to return a valid result, the inputs to the floating-point operations must be appropriate for the type of floating-point operation being performed. If the inputs to a floating-point operation are not appropriate, the processor attempting to perform the operation may return an invalid floating-point operation. Examples of invalid floating-point operations may include division by zero, square root of a negative number, invalid comparisons or conversions, and the like.

In certain processor architectures, when a piece of software attempts to perform an invalid floating-point operation, the processor running the software raises an exception. When this occurs, the software must handle the exception right away in order for execution of the software to continue. As such, software applications often include an exception handler to handle this type of exception in order to prevent the software from crashing when an exception is raised.

However, some processors detect and annunciate invalid floating-point operations differently. In particular, many ARM® processors do not raise an exception when an invalid floating-point operation occurs. Instead, when an invalid floating-point operation occurs, these processors record an error in a floating-point status register. The processor then continues with execution of the software.

This allows the processor to execute the software without the need to handle an exception every time an invalid floating-point operation occurs. However, when a floating-point operation results in an invalid result, the behavior of any logic that uses the result is unpredictable. For example, if an invalid divide by zero error is propagated through an engine control system to regulate fuel to an engine, the unpredictability caused by the divide by zero error may lead to an improper fuel amount being delivered to the engine, which may result in the engine not functioning properly. As such, it may be desirable for the software to periodically monitor the floating-point status register and take appropriate action to deal with any invalid floating-point errors that have been recorded.

One way to address such invalid floating-point errors is to check the floating-point status register every time that a floating-point operation is performed to see if an error has been recorded. This would allow a software application to handle an invalid floating-point error as soon it occurs, in a similar manner as a software program operating on a traditional processor that raises an exception every time an invalid floating-point operation occurs. However, this may require frequent checks of the floating-point status register, which may unnecessarily waste throughput.

Accordingly, in embodiments disclosed herein, the floating-point status register is checked every time that an application programming interface (API) call is made. Any invalid floating-point errors recorded in the floating-point status register may be dealt with in an appropriate manner at that time. This may allow floating-point errors to be dealt with before impacting the overall system in which the processor operates, without the need to deal with every floating-point error at the time it occurs.

The systems and methods described herein may find particular applicability in systems in which a processor that does not raise floating-point exceptions is used as part of an embedded system that digitally manages all aspects of a device (e.g., an aircraft engine, or the like). In an embedded system, floating-point errors may particularly impact system performance when a command is sent to control or affect a hardware component or device outside of the processor, such as a memory or actuator, which is done using an API call. Accordingly, by checking the floating-point status register before an API call is made, the system may ensure that floating-point errors do not affect external components and devices outside of the processor. However, it should be understood that in other examples, the systems and methods described herein may be utilized by any processor or computing device.

FIG. 1 depicts an illustrative computing device 120 for handling invalid floating-point operations without exceptions. The computing device 120 described herein may be a computing system, a specialized device or system (e.g., an embedded real-time control system, medical equipment, or the like) in various embodiments. Accordingly, while in some embodiments the computing device 120 may be configured as a general purpose computer with the requisite hardware, software, and/or firmware, in some embodiments, the computing device 120 may be configured as a special purpose device or system designed specifically for performing particular tasks, as well as the functionality described herein. In some examples, the computing device 120 may comprise an ARM® processor. However, in other examples, the computing device 120 may comprise another type of processor or computing device.

As illustrated in FIG. 1, the computing device 120 includes a processor 20, input/output hardware 22, network interface hardware 24, a data storage component 26, and a non-transitory memory component 30. A local interface 40 is also included in FIG. 1 and may be implemented as a bus or other interface to facilitate communication among the components of the computing device 120. For example, the local interface 40 may communicatively couple the memory component 30 to the processor 20.

In some examples, a processor may be divided into a plurality of partitions, with each partition performing different functionality. For example, one partition may control engine control functionality and another partition may control reporting functionality.

The processor 20, such as a central processing unit (CPU), may be the central processing unit of the computing device 120, performing calculations and logic operations to execute a program (e.g., application software). The processor 20, alone or in conjunction with the other components, is an illustrative processing device, computing device, processor, or combinations thereof, including, for example, a multi-core processor, a microcontroller, a field-programmable gate array (FPGA), or an application-specific integrated circuit (ASIC). The processor 20 may include any processing component configured to receive and execute instructions (such as from the data storage component 26 and/or the memory component 30). In some embodiments, the processor 20 may be a plurality of processing devices.

The input/output hardware 22 may include a monitor, a keyboard, a mouse, a printer, a camera, a microphone, a speaker, a touch-screen, a motor controller, a solenoid and valve driver, an analog or a digital sensor (e.g., temperature, pressure, positional, etc.) and/or other device for receiving, sending, and/or presenting data, reading sensors or controlling motors, valves, solenoids and the like, particularly those used in aviation systems, transportation systems, process control systems, power generation and distribution systems, healthcare systems, and/or the like. For example, the input/output hardware 22 may include a CAN bus, a serial bus, and/or another industry standard bus. In a particular embodiment, the input/output hardware 22 may be hardware that is certified as compliant with applicable industry standards, such as ARINC characteristics or specifications (formerly promulgated by Aeronautical Radio, Inc, presently by the SAE Industry Technologies Consortia).

The network interface hardware 24 may include any wired or wireless networking hardware, such as a modem, LAN port, wireless fidelity (Wi-Fi) card, WiMax card, mobile communications hardware, and/or other hardware for communicating with other networks and/or devices. For example, the network interface hardware 24 may be used to facilitate communication between external storage devices, user computing devices, server computing devices, external control devices, and/or the like via a network, such as, for example, a local network, the Internet, and/or the like.

The data storage component 26 is generally a storage medium, and may contain one or more data repositories for storing data that is received and/or generated. The data storage component 26 may be any physical storage medium, including, but not limited to, a hard disk drive (HDD), memory (e.g., read-only memory (ROM), programmable read-only memory (PROM), random access memory (RAM), double data rate (DDR) RAM, flash memory, and/or the like), removable storage, a configuration file (e.g., text) and/or the like. While the data storage component 26 is depicted as a local device, it should be understood that the data storage component 26 may be a remote storage device, such as, for example, a server computing device, cloud-based storage device, or the like.

In the example of FIG. 1, the data storage component 26 includes a floating-point status register 26a and a configuration file 26b. When the processor 20 encounters an invalid floating-point operation, the processor 20 records an error detailing the invalid floating-point operation in the floating-point status register 26a. As such, the floating-point status register 26a maintains a record of invalid floating-point operations encountered by the processor 20. The configuration file 26b stores configuration data including one or more predefined actions indicating how invalid floating-point operations should be handled, as discussed in further detail below. In some examples, the predefined action for a type of floating-point operation may depend on the criticality of the software being executed.

The memory component 30 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 30 may be configured to include various logic modules (each of which may be embodied as a computer program, firmware, or hardware, as an example).

The memory component 30 may include a plurality of logic modules. Each of the logic modules may be embodied as a computer program, firmware, or hardware, as an example. In particular, included in the memory component is operating system logic 32, application software logic 34, floating-point status register analysis logic 36, floating-point error handling logic 37, floating-point error clearing logic 38, and checker API logic 39.

The operating system logic 32 may load operating system software to control operation of the computing device 120. The application software logic 34 may load application software to be run by the processor 20. As explained above, while the processor 20 is running the application software loaded by the application software logic 34, the application software may cause the processor 20 to encounter an invalid floating-point operation. If this occurs, the processor 20 may store details of the invalid floating-point operation in the floating-point status register 26a of the data storage component 26, as explained in further detail below.

In some examples, a processor may execute processes that are logically partitioned from each other. Each partition may perform different functionality. For example, one partition may perform engine control and another partition may perform fault reporting. Each partition may have its own memory space and its own floating-point status register. In addition, different partitions may each operate different software applications (e.g., based on functionality). As such, in some examples, the computing device 120 in the example of FIG. 1 may represent a single partition of a processor. Other partitions may be constructed in a similar manner (e.g., with their own memory spaces and floating-point status registers).

In some examples, two channels are used for redundancy of operation. That is, one channel may contain each partition of the plurality of partitions and another channel may contain the same plurality of partitions. As such, each channel may contain the same hardware and software components and may operate in a similar manner. However, if one channel fails, the other channel may still be able to operate. In some examples, one channel is active at any one time while the other channel is on standby.

When application software operating on a particular partition needs to access or communicate with a hardware or software component outside of the partition (e.g., memory, an actuator, another partition, and the like), the partition may make an API call. As such, when an API call is made to access or communicate with a hardware or software component outside of the partition, if an invalid floating-point operation has not been handled by the partition, the response to the API call may be unpredictable. Therefore, as disclosed herein, when an API call is made by a particular partition, the floating-point status register may be checked for that partition. If there are any floating-point errors, they may be handled before the primary function of the API is executed. Each partition may also have a configuration file (e.g., configuration file 26b) that indicates how floating-point errors for that partition should be handled. Accordingly, the partition may handle floating-point errors in accordance with the configuration file for the partition.

Referring still to FIG. 1, the floating-point status register analysis logic 36 may access the floating-point status register 26a and determine whether any floating-point errors (e.g., invalid floating-point operations) have been recorded. As discussed above, whenever the processor 20 encounters an invalid floating-point operation, the processor 20 records an error in the floating-point status register 26a indicating the type of invalid floating-point operation. As such, over time, each type of invalid floating-point operation that occurs will be recorded in the floating-point status register 26a. Thus, the floating-point status register analysis logic 36 may access the floating-point status register 26a and read each type of floating-point error recorded therein.

Referring still to FIG. 1, the floating-point error handling logic 37 may handle floating-point errors identified by the floating-point status register analysis logic 36, as disclosed herein. In particular, the floating-point error handling logic 37 may handle floating-point errors in accordance with the configuration file 26b. As discussed above, the configuration file 26b may indicate how floating-point errors should be handled. In some examples, the configuration file 26b may indicate how different types of floating-point errors should be handled. In other examples, the configuration file 26b may indicate that all floating-point errors should be handled in the same manner.

In some examples, the configuration file 26b may indicate that a particular floating-point error should be handled by either resetting the partition, resetting the channel, stopping the partition, stopping the channel, or doing nothing. When the floating-point status register analysis logic 36 identifies a floating-point error, the floating-point error handling logic 37 may access the configuration file 26b to determine how the floating-point error should be handled. The floating-point error handling logic 37 may then cause the appropriate action to be taken to handle the floating-point error based on the configuration file 26b. That is, the floating-point error handling logic 37 may stop or reset the partition, stop or reset the channel, or return to the application software making the API call, based on the configuration file 26b. In some examples, the floating-point error handling logic 37 also records details of floating-point errors identified by the floating-point status register analysis logic 36 in a log file. For example, the floating-point error handling logic 37 may log an event in an event log for each floating-point error identified by the floating-point status register analysis logic 36.

Referring still to FIG. 1, the floating-point error clearing logic 38 may clear the floating-point errors recorded in the floating-point status register 26a. In particular, the floating-point error clearing logic 38 may clear the floating-point errors recorded in the floating-point status register 26a after the errors have been handled by the floating-point error handling logic 37. In some examples, the floating-point error clearing logic 38 may clear the floating-point errors recorded in the floating-point status register 26a before the errors are handled by the floating-point error handling logic 37. Thus, once each error is handled, the floating-point status register analysis logic 36 is prevented from detecting the same error multiple times.

Referring still to FIG. 1, the checker API logic 39 may check the floating-point status register 26a on an ad hoc basis (e.g., an API dedicated to checking the floating-point status register and taking action when an invalid floating-point operation has been detected). As explained above, the floating-point status register analysis logic 36 checks the floating-point status register 26a of a partition whenever the partition makes an API call. However, some partitions do not make API calls to perform functions other than detecting invalid floating-point operations. Thus, for these partitions, the floating-point status register analysis logic 36 may never check the floating-point status register 26a. Accordingly, the checker API logic 39 may call a special-purpose checker API that accesses the floating-point status register 26a to check for floating-point errors recorded by the processor 20.

In addition, the checker API logic 39 may be utilized for debugging purposes. As explained above, the floating-point status register analysis logic 36 of a partition only checks the floating-point status register 26a when a partition makes an API call to communicate with components outside of the partition. As such, one or more floating-point errors may be recorded in the floating-point status register 26a for a while before they are detected by the floating-point status register analysis logic 36. Accordingly, by the time a floating-point error is detected by the floating-point status register analysis logic 36, it may be difficult to determine the source of the error. Accordingly, while debugging, the checker API logic 39 may be used to proactively check the floating-point status register 26a to identify floating-point errors before an API call that impacts a component outside of the partition is made. Examples of floating-point errors may include NaN generation (signaling or quiet), infinity (inf)—inf, inf/inf, zero/zero, inf x zero, invalid compare, and invalid integer convert.

Figure 2:
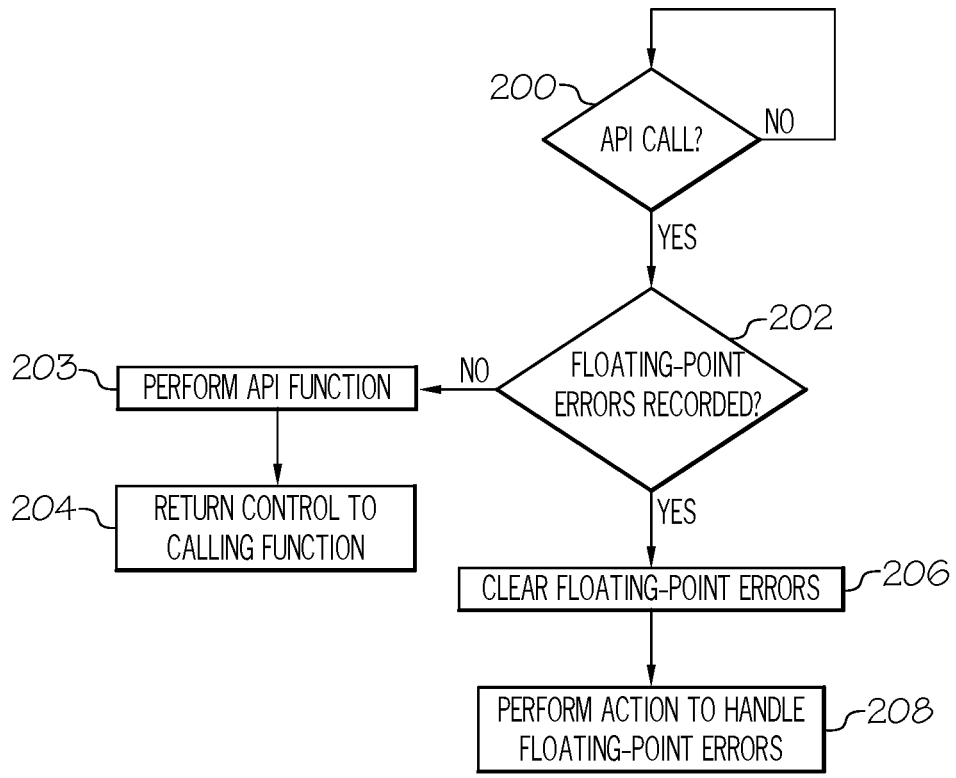
FIG. 2 depicts a flow diagram of an illustrative method of handling invalid floating-point operations without exceptions, according to one or more embodiments shown and described herein.

Referring now to FIG. 2, at block 200, the floating-point status register analysis logic 36 determines whether application software has made an API call. Specifically, the floating-point status register analysis logic 36 within a particular partition may determine whether application software running on the partition has made an API call to communicate with one or more hardware or software components outside of the partition. If the floating-point status register analysis logic 36 determines that an API call has not been made ("NO" at block 200), then control returns to block 200 until an API call is made. If the floating-point status register analysis logic 36 determines that an API call has been made ("YES" at block 200), then control advances to block 202.

At block 202, the floating-point status register analysis logic 36 accesses the floating-point status register 26a for the partition and analyzes the floating-point status register 26a to determine whether any floating-point errors have been recorded since the last time the. If the floating-point status register analysis logic 36 determines that no floating-point errors have been recorded in the floating-point status register 26a ("NO" at block 202), then control passes to block 203. If the floating-point status register analysis logic 36 determines that one or more floating-point errors have been recorded in the floating-point status register 26a ("YES" at block 202), then control passes to block 206.

At block 203, after the floating-point status register analysis logic 36 determines that no floating-point errors have been recorded in the floating-point status register 26a, the function of the API that was called is performed. Then, at block 204, control is returned to the calling function, which may be the operating system or application software.

At block 206, after the floating-point status register analysis logic 36 determines that one or more floating-point errors have been recorded in the floating-point status register 26a, the floating-point error clearing logic 38 clears the floating-point errors recorded in the floating-point status register 26a. At block 208, the floating-point error handling logic 37 performs an action to handle the floating-point errors recorded in the floating-point status register 26a. In particular, the floating-point error handling logic 37 may access the configuration file 26b to determine the appropriate action to take. The configuration file 26b may indicate that an appropriate action to handle the one or more recorded floating-point status errors is to either stop or reset the channel, stop or reset the partition, or do nothing and return control to the calling function (either the operating system or application software), which may then perform the function of the API that was called.

Figure 3:
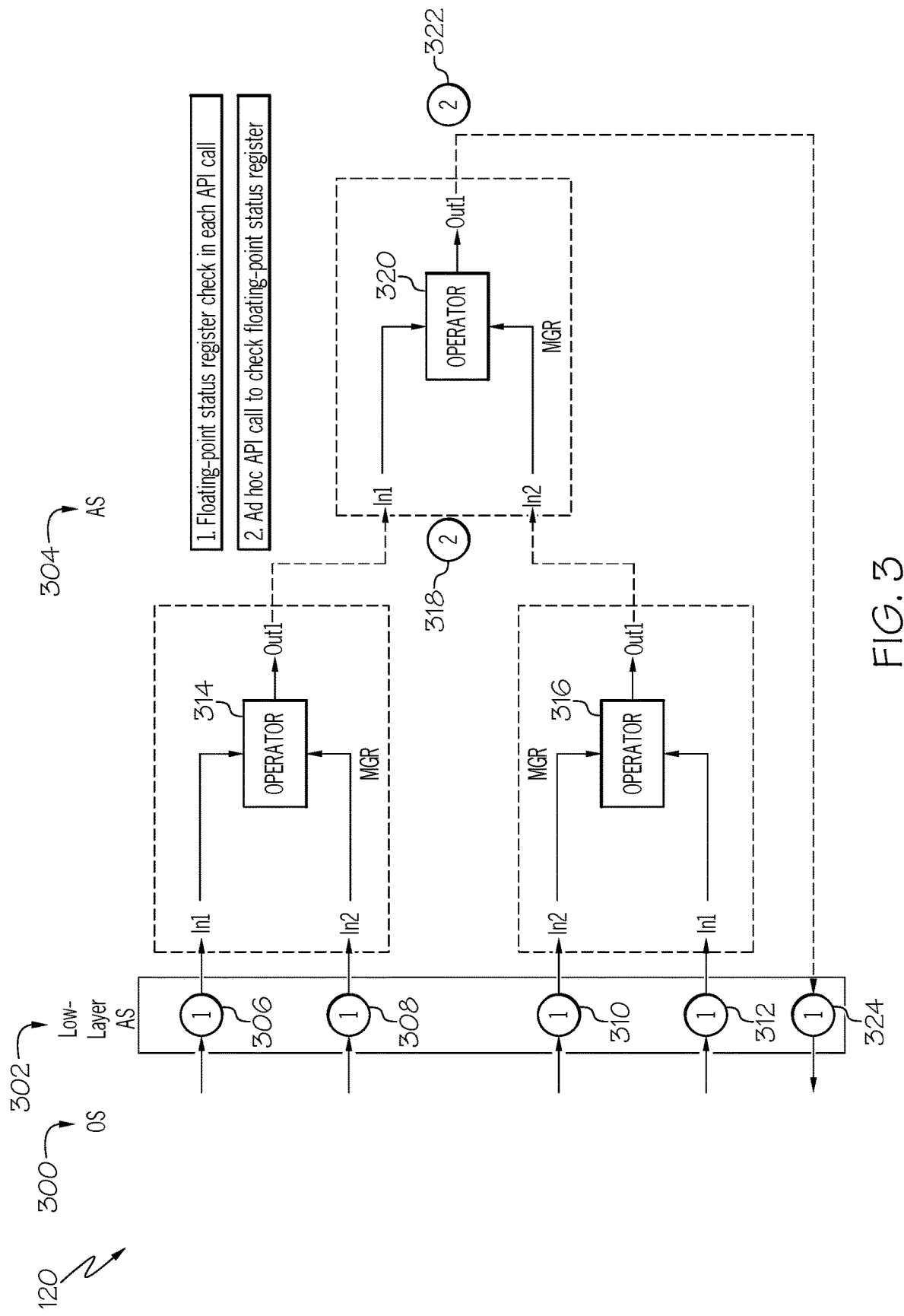
FIG. 3 depicts an example processing flow of software running on the computing device of FIG. 1.

Referring now to FIG. 3, an example processing flow of software running on the computing device 120 is shown. In the example of FIG. 3, the computing device 120 includes an operating system (OS) 300, a low-layer application software (low-layer AS) 302, and application software (AS) 304. The low-layer AS 302 acts as an interface layer between the OS 300 and the AS 304. In particular, the low-layer AS 304 allows data to be transferred between the OS 300 and the AS 304.

In the example of FIG. 3, a plurality of API calls 306, 308, 310, and 312 are made. When these API calls are made, the OS 300 provides data to the AS 304 via the low-layer AS 302. After each API call is made, the floating-point status register 26a may be checked and any floating-point errors recorded may be handled, as discussed above.

In the example of FIG. 3, the data associated with the API calls 306 and 308 is used by the AS 304 to perform operator 314 and the data associated with the API calls 310 and 312 is used by the AS 304 to perform operator 316. The operators 314 and 316 may be functions associated with the system in which the computing device 120 operates (e.g., an aircraft engine control system). For example, the operator 314 may get a speed of the aircraft based on the data associated with the API calls 306 and 308, and the operator 316 may get a temperature of the aircraft based on the data associated with the API calls 310 and 312.

The AS 304 may then perform ad hoc API call 318 to explicitly check the floating-point status register 26a and handle any errors, as discussed above. Data associated with the operators 314 and 316 (e.g., speed and temperature) may then be used by the AS 304 to perform operator 320. For example, the operator 320 may calculate a fuel flow rate based on the speed and temperature output by the operators 314 and 316, respectively.

The AS 304 may then perform another ad hoc API call 322 to handle any errors recorded in the floating-point status register 26a. Any data output by the operator 320 (e.g., the calculated fuel flow rate) may be transmitted back to the OS 300 through the low-layer AS 302 by performing API call 324. After the API call 324 is made, the floating-point status register 26a may again be checked and any floating-point errors recorded may be handled, as discussed above.

It should now be understood that embodiments described herein have a technical effect of handling invalid floating-point operations without exceptions. In particular, when a processor encounters an invalid floating-point operation, the processor records a floating-point error in a floating-point status register associated with a partition. When application software within the partition performs an API call to communicate with a hardware or software device outside of the partition, the floating-point status register is checked to determine if any floating-point errors have been recorded to the floating-point status register since the last time the floating-point status register was checked. If so, a configuration file is accessed, which contains instructions for handling floating-point errors. An action may then be taken to handle the floating-point errors recorded in the floating-point status register based on the configuration file. As such, invalid floating-point operations stored in the floating-point status register may be properly handled, thereby avoiding unpredictable behavior that may otherwise be caused by such invalid operations.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Further aspects of the invention are provided by the subject matter of the following clauses:

A method to be performed by a processor, comprising: determining whether an application software has called an application programming interface; upon determination that the application software has called the application programming interface, determining whether one or more floating-point errors are recorded in a floating-point status register; and upon determination that one or more floating-point errors are recorded in the floating-point status register, performing a predefined action for each type of floating-point error recorded in the floating-point status register.

The method of any preceding clause, further comprising logging an event in an event log for each of the one or more floating-point errors recorded in the floating-point status register.

The method of any preceding clause, wherein, when the processor performs an invalid floating-point operation, the processor records a floating-point error in the floating-point status register.

The method of any preceding clause, further comprising performing the predefined action based on data stored in a configuration file.

The method of any preceding clause, wherein the configuration file contains data indicating the predefined action to be taken to handle a floating-point error.

The method of any preceding clause, wherein the predefined action to be taken to handle a floating-point error is based on a criticality of the application software.

The method of any preceding clause, wherein: the processor comprises one or more channels; each of the one or more channels comprises one or more partitions; and each partition runs different application software.

The method of any preceding clause, wherein each partition contains a floating-point status register that is independent from the floating-point status registers of other partitions.

The method of any preceding clause, wherein, when the processor performs an invalid floating-point operation, the processor records a floating-point error in a floating-point status register associated with the partition that cause the invalid floating-point operation.

The method of any preceding clause, wherein the predefined action comprises one of resetting the channel, stopping the channel, resetting the partition, stopping the partition, and returning control to the application software.

A device comprising: one or more processors; and one or more non-transitory memory modules communicatively coupled to the one or more processors and storing machine-readable instructions that, when executed, cause the one or more processors to at least: determine whether an application software has called an application programming interface; upon determination that the application software has called the application programming interface, determine whether one or more floating-point errors are recorded in a floating-point status register; and upon determination that one or more floating-point errors are recorded in the floating-point status register, perform a predefined action for each type of floating-point error recorded in the floating-point status register.

The device of any preceding clause, wherein the instructions further cause the one or more processors to log an event in an event log for each of the one or more floating-point errors recorded in the floating-point status register.

The device of any preceding clause, wherein, when the one or more processors perform an invalid floating-point operation, the one or more processors record a floating-point error in the floating-point status register.

The device of any preceding clause, wherein the instructions further cause the one or more processors to perform the predefined action based on data stored in a configuration file.

The device of any preceding clause, wherein the configuration file contains data indicating the predefined action to be taken to handle a floating-point error.

The device of any preceding clause, wherein the predefined action to be taken to handle a floating-point error is based on a criticality of the application software.

The device of any preceding clause, wherein: the one or more processors comprise one or more channels; each of the one or more channels comprises one or more partitions; and each partition runs different application software.

The device of any preceding clause, wherein each partition contains a floating-point status register that is independent from the floating-point status registers of other partitions.

The device of any preceding clause, wherein, when the one or more processors perform an invalid floating-point operation, the one or more processors record a floating-point error in a floating-point status register associated with the partition that cause the invalid floating-point operation.

The device of any preceding clause, wherein the predefined action comprises one of resetting the channel, stopping the channel, resetting the partition, stopping the partition, and returning control to the application software.

What is claimed is:

1. A device comprising:
one or more processors; and
one or more non-transitory memory modules communicatively coupled to the one or more processors and storing machine-readable instructions that, when executed, cause the one or more processors to at least:
determine whether an application software has called an application programming interface;
upon determination that the application software has called the application programming interface, determine whether one or more floating-point errors are recorded in a floating-point status register; and
upon determination that one or more floating-point errors are recorded in the floating-point status register, perform a predefined action for each type of floating-point error recorded in the floating-point status register.

2. The device of claim 1, wherein the instructions further cause the one or more processors to log an event in an event log for each of the one or more floating-point errors recorded in the floating-point status register.

3. The device of claim 1, wherein, when the one or more processors perform an invalid floating-point operation, the one or more processors record a floating-point error in the floating-point status register.

4. The device of claim 1, wherein the instructions further cause the one or more processors to perform the predefined action based on data stored in a configuration file.

5. The device of claim 4, wherein the configuration file contains data indicating the predefined action to be taken to handle a floating-point error.

6. The device of claim 1, wherein the predefined action to be taken to handle a floating-point error is based on a criticality of the application software.

7. The device of claim 1, wherein:
the one or more processors comprise one or more channels;
each of the one or more channels comprises one or more partitions; and
each partition runs different application software.

8. The device of claim 7, wherein each partition contains a floating-point status register that is independent from the floating-point status registers of other partitions.

9. The device of claim 7, wherein, when the one or more processors perform an invalid floating-point operation, the one or more processors record a floating-point error in a floating-point status register associated with a partition among the one or more partitions that caused the invalid floating-point operation.

10. The device of claim 7, wherein the predefined action comprises one of resetting a first channel among the one or more channels, stopping the first channel, resetting a first partition among the one or more partitions, stopping the first partition, and returning control to the application software.

11. A method to be performed by a processor, comprising:
determining whether an application software has called an application programming interface;
upon determination that the application software has called the application programming interface, determining whether one or more floating-point errors are recorded in a floating-point status register; and
upon determination that one or more floating-point errors are recorded in the floating-point status register, performing a predefined action for each type of floating-point error recorded in the floating-point status register.

12. The method of claim 11, further comprising logging an event in an event log for each of the one or more floating-point errors recorded in the floating-point status register.

13. The method of claim 11, wherein, when the processor performs an invalid floating-point operation, the processor records a floating-point error in the floating-point status register.

14. The method of claim 11, further comprising performing the predefined action based on data stored in a configuration file.

15. The method of claim 14, wherein the configuration file contains data indicating the predefined action to be taken to handle a floating-point error.

16. The method of claim 11, wherein the predefined action to be taken to handle a floating-point error is based on a criticality of the application software.

17. The method of claim 11, wherein:
the processor comprises one or more channels;
each of the one or more channels comprises one or more partitions; and
each partition runs different application software.

18. The method of claim 17, wherein each partition contains a floating-point status register that is independent from the floating-point status registers of other partitions.

19. The method of claim 17, wherein, when the processor performs an invalid floating-point operation, the processor records a floating-point error in a floating-point status register associated with a partition among the one or more partitions that caused the invalid floating-point operation.

20. The method of claim 17, wherein the predefined action comprises one of resetting a first channel among the one or more channels, stopping the first channel, resetting a first partition among the one or more partitions, stopping the first partition, and returning control to the application software.

* * * * *